US011169849B2

(12) United States Patent
Cantley et al.

(10) Patent No.: US 11,169,849 B2
(45) Date of Patent: Nov. 9, 2021

(54) INTELLIGENT RESOURCE INITIATION AND DEPLOYMENT SYSTEM (71) Applicant: BANK OF AMERICA CORPORATION, Charlotte, NC (US)

(72) Inventors: Kerry Michelle Cantley, Fort Mill, SC (US); Heather Roseann Dolan, Sarasota, FL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 279 days.

(21) Appl. No.: 16/447,501

(22) Filed: Jun. 20, 2019

(65) Prior Publication Data

US 2020/0401448 A1 Dec. 24, 2020

(51) Int. Cl.
*G06F 9/50* (2006.01)

(52) U.S. Cl.
CPC ........ *G06F 9/50* (2013.01); *G06F 2209/5011* (2013.01)

(58) Field of Classification Search
None
See application file for complete search history.

(56) References Cited

U.S. PATENT DOCUMENTS

| 9,195,982 | B2 | 11/2015 | Orr et al. |
| 9,225,787 | B2* | 12/2015 | Jackson ................. H04L 67/18 |
| 9,424,572 | B2 | 8/2016 | Bondesen et al. |
| 9,450,942 | B1* | 9/2016 | Vazquez ............... H04L 61/609 |
| 9,489,671 | B2 | 11/2016 | Zhou et al. |
| 9,639,836 | B2 | 5/2017 | Bondesen et al. |
| 9,652,764 | B2 | 5/2017 | Bondesen et al. |
| 9,672,382 | B2* | 6/2017 | Kumar ................. G06F 21/6272 |
| 9,848,294 | B2* | 12/2017 | Li ......................... H04W 72/04 |
| 10,007,900 | B2 | 6/2018 | Royyuru et al. |
| 10,140,470 | B2* | 11/2018 | Kurian ................. H04L 9/3236 |
| 10,158,703 | B2* | 12/2018 | Kurian ............. G06Q 10/06312 |
| 10,320,662 | B1* | 6/2019 | Ahuja ..................... H04L 45/42 |
| 10,334,026 | B2* | 6/2019 | Dintenfass ............ G06F 9/5077 |
| 10,454,993 | B2* | 10/2019 | Kurian ................. H04W 12/062 |
| 10,530,780 | B2* | 1/2020 | Henry ................... H04L 63/104 |
| 10,641,861 | B2* | 5/2020 | Dupray ................. G01S 5/0278 |
| 11,087,324 | B2* | 8/2021 | Dintenfass ........... G06Q 20/405 |
| 2010/0146132 | A1* | 6/2010 | Morris ................. H04L 61/6018 709/229 |

(Continued)

Primary Examiner — Hiren P Patel
(74) Attorney, Agent, or Firm — Michael A. Springs; Moore & Van Allen PLLC; Jeffrey R. Gray (57) ABSTRACT An intelligent resource initiation and deployment system is provided that identifies a location of a user, identifies entities adjacent the user based on the user location, and identifies a resource application and/or the resource pools. The invention identifies a resource pool which optimizes resource grants for the user based on the desired outcome of the user and/or the entity at which the user is located. The system further includes identifying when the resource pool is active, or what additional information is needed for the user to make the optimized resource pool active. The present invention shifts the processing capacity, memory, and processing speeds related to determination and selection of a resource pool and/or validation of the resource pool during interactions from the time of the interaction to before the interaction is even initiated.

20 Claims, 3 Drawing Sheets (56) References Cited

U.S. PATENT DOCUMENTS

| | | | |
|---|---|---|---|
| 2014/0258450 A1* | 9/2014 | Suryanarayanan | H04L 47/70 709/217 |
| 2014/0297520 A1* | 10/2014 | Levchin | G06Q 20/38215 705/39 |
| 2016/0005006 A1* | 1/2016 | Subramanian | G06Q 10/063114 705/7.15 |
| 2016/0232518 A1* | 8/2016 | Butler, IV | G06Q 20/204 |
| 2017/0243025 A1* | 8/2017 | Kurian | G06Q 40/00 |
| 2017/0330159 A1* | 11/2017 | Castinado | G06Q 20/02 |
| 2017/0359408 A1* | 12/2017 | Kurian | G06Q 10/06 |
| 2018/0041442 A1* | 2/2018 | Jones-Mcfadden | H04L 41/0896 |
| 2018/0041449 A1* | 2/2018 | Dintenfass | H04L 67/10 |
| 2018/0053169 A1 | 2/2018 | James | |
| 2018/0101837 A1 | 4/2018 | Pandey et al. | |
| 2018/0204195 A1 | 7/2018 | Kang | |
| 2018/0288575 A1 | 10/2018 | Lal | |
| 2018/0349889 A1 | 12/2018 | Ghosh et al. | |
| 2018/0357636 A1 | 12/2018 | Kumar et al. | |

* cited by examiner

INTELLIGENT RESOURCE INITIATION AND DEPLOYMENT SYSTEM

FIELD

The present invention relates to a resource system for interactions, and more particularly a resource initiation and deployment system for interactions.

BACKGROUND

Typically, a user makes the decision regarding what resources to utilize within an interaction, however, the user decision may not always be the most beneficial decision for the user's own interests. Furthermore, on-boarding various resources may be time consuming and may present potential security issues for the user. Having to select the resources and/or on-board the resources for new interactions reduces the processing speeds to complete interactions and reduces the security related to the use of such resources.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein that provide for identifying a location of a user, identifying entities adjacent the user based on the user location, and identifying a resource application and/or the resource pools within a resource application of the user. The invention identifies a resource pool which optimizes resource grants for the user based on the desired outcome of the user, the entity at which the user is located, and/or the products (e.g., goods or services) with which the user is interested. The invention further includes identifying when the resource pool is active, or what additional information is needed for the user to make the optimized resource pool active. The present invention shifts the processing capacity, memory, and processing speeds related to determination and selection of a resource pool and/or validation of the resource pool during interactions between entities from the time of the interaction to before the interaction is even initiated. In this way the systems may more efficiently identity and/or validate the resource pool outside of the interaction, which reduces the processing capacity and memory, and increases the processing speeds during the interaction time when the entities enter into an interaction.

Embodiments of the invention comprise systems, computer implemented method, and/or computer program products for initiating and deploying resources for interactions. The invention comprises identifying a user location of a user using a user computer system and identifying an entity at which the user is located based on the user location. The invention further comprises identifying a plurality of resource pools and identifying a resource pool from the plurality of resource pools based on optimization of resource grants for the plurality of resource pools based on using each of the plurality of resource pools with the entity. The invention further comprises sending a resource pool notification to the user computer system of the user before the user enters into an interaction with the entity.

In further accord with embodiments of the invention, identifying the plurality of resource pools comprises identifying a resource application of the user and identifying one or more user resource pools within the resource application. The invention further comprises accessing one or more providers of resource pools and identifying one or more potential resource pools that the user does not currently have.

In other embodiments of the invention, sending the resource pool notification to the user computer system of the user comprises changing an interface on a display of the user computer system of the user with a resource status indicator to indicate that the resource pool is recommended for use with the entity.

In still other embodiments of the invention, sending the resource pool notification to the user computer system of the user comprises changing an interface on a display of the user computer system of the user with a resource status indicator to indicate that the resource pool within the resource application is active and ready for use with the entity.

In yet other embodiments of the invention, sending the resource pool notification to the user computer system of the user comprises changing an interface on a display of the user computer system of the user with a resource status indicator to indicate that the resource pool recommended requires activation by the user before use with the entity.

In other embodiments of the invention, the user location is based on one or more location determining components of the user computer system of the user.

In further accord with embodiments of the invention, the one or more location determining components utilize near-field communication (NFC) with one or more third-party systems in order to determine the user location.

In other embodiments of the invention, the one or more location determining components utilize global positioning systems (GPS) in order to determine the user location.

In still other embodiments of the invention, the one or more location determining components utilize geo-fencing in order to determine the user location.

In yet other embodiments of the invention, the resource application of the user is a digital wallet and the plurality of resource pools are a plurality of resource accounts.

In other embodiments of the invention, identifying the resource pool from the plurality of resource pools comprises identifying the resource pool that is provided by the entity at which the user is located.

In further accord with embodiments of the invention, identifying the resource pool from the plurality of resource pools comprises identifying an available resource pool that is currently in the resource application.

In other embodiments of the invention, identifying the resource pool from the plurality of resource pools comprises identifying a potential resource pool that is not in the resource application of the user.

In still other embodiments of the invention, sending the resource pool notification to the user computer system of the user before the user enters into the interaction with the entity comprises notifying the user of the potential resource pool that is not in the resource application of the user by changing an interface on a display of the user computer system of the user.

In yet other embodiments of the invention, identifying the resource pool from the plurality of resource pools based on optimization of resource grants comprises identifying the resource pool that provides maximized resources for the interaction with the entity at the user location.

In other embodiments of the invention, sending the resource pool notification to the user computer system of the user comprises changing an interface on a display of the user computer system to provide a resource status indicator, and wherein the resource status indicator comprises one or more resource pools, one or more resource grants for the one or more resource pools for the interaction with the entity at the user location, and an indication if the one or more resource pools are active.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, and wherein:

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide for identifying a location of a user, identifying entities adjacent the user based on the user location, and identifying a resource application and/or the resource pools within a resource application of the user. The invention identifies a resource pool which optimizes resource grants for the user based on the desired outcome of the user, the entity at which the user is located, and/or the products (e.g., goods or services) with which the user is interested. The invention further includes identifying when the resource pool is active, or what additional information is needed for the user to make the optimized resource pool active. The present invention shifts the processing capacity, memory, and processing speeds related to determination and selection of a resource pool and/or validation of the resource pool during interactions between entities from the time of the interaction to before the interaction is even initiated. In this way the systems may more efficiently identity and/or validate the resource pool outside of the interaction, which reduces the processing capacity and memory, and increases the processing speeds during the interaction time when the entities enter into an interaction.

Figure 1:
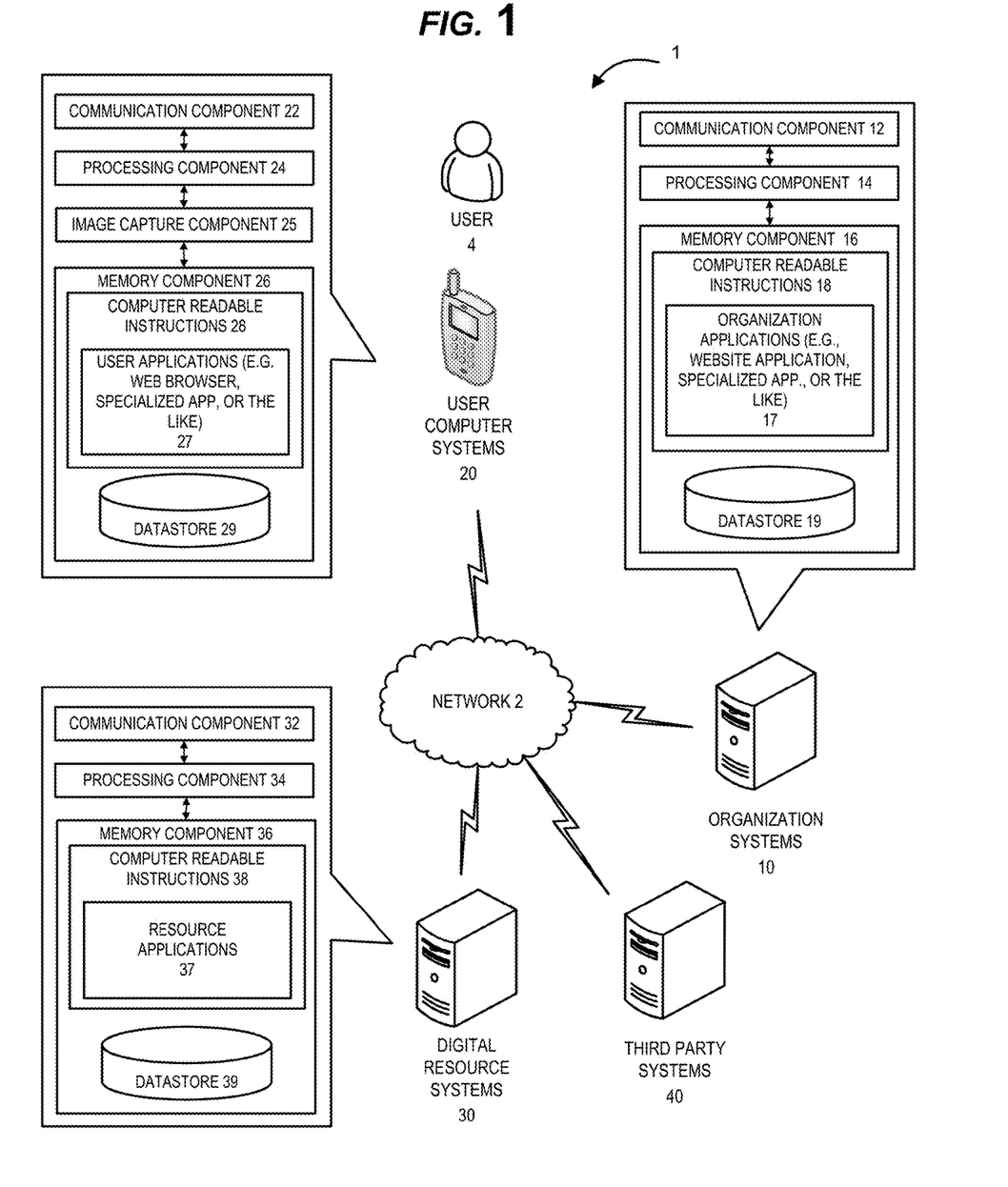
FIG. 1 illustrates a block diagram of a resource system environment, in accordance with embodiments of the invention.

FIG. 1 illustrates a resource system environment 1, in accordance with embodiments of the invention. As illustrated in FIG. 1, one or more organization systems 10 are operatively coupled, via a network 2, to one or more user computer systems 20, one or more digital resource systems 30, one or more third-party systems 40, and/or one or more other systems (not illustrated). In this way, a user 4 may be notified of an available resource pool when the user location meets a third-party entity location (e.g., as determined by a location determination device of the user computer systems 20), as will be described herein. As will be further described herein, the available resource pool may be the most beneficial resource pool for a desired outcome (e.g., as determined by the interests of the user and/or the interests of the organization).

The organization systems 10 may facilitate interactions between the user 4 and the third-party by communicating with the user computer systems 20, the digital resource systems 30, the third-party systems 40, and/or other systems through the network 2. The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the organization systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the one or more entity computer systems 20, the one or more digital resource systems 30, the one or more third-party systems 40, and/or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors, or the like.

As further illustrated in FIG. 1, the organization systems 10 comprise computer-readable instructions 18 stored in the memory component 16, which in one embodiment includes the computer-readable instructions 18 of the organization application 17 (e.g., website applications, dedicated applications, internal applications, or the like). In some embodiments, the one or more memory components 16 include one or more data stores 19 for storing data related to the organization systems 10, including, but not limited to, data created, accessed, and/or used by the organization application 17. The organization application 17 may be utilized to facilitate interactions and resource exchanges between entities (e.g., users 4, third parties, or the like) using the various systems, as will be described in further detail herein.

As illustrated in FIG. 1, the user 4 may utilize the user computer systems 20 to enter into interactions with third-parties. Moreover, the users 4 may access the organization application 17, through the one or more user computer systems 20 to provide resources to the third-party. Furthermore, the user 4 may utilize the user computer systems 20 to access the resource application (e.g., digital resource application) 37 on the digital resource systems 30 in order to access a resource pool from a plurality of resource pools associated with (e.g., located within) the resource application of the user 4. The one or more user computer systems 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22, the one or more image capture components 25, and the one or more memory components 26. The one or more processing components 24 use the one or more communication components 22 to communicate with the network 2 and other components on the network 2, such as, but not limited to, the organization systems 10, the digital resource systems 30, the third-party systems 40, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors, or the like. Moreover, the one or more communication components 22 may include a keypad, keyboard, touch-screen, touchpad, microphone, mouse, joystick, other pointer component, button, soft key, and/or other input/output component(s) for communicating with the user 4.

As illustrated in FIG. 1, the one or more user computer systems 20 may have computer-readable instructions 28 stored in the one or more memory components 26, which in one embodiment includes the computer-readable instructions 28 for one or more entity applications 27, such as dedicated applications (e.g., apps, applet, or the like), portions of dedicated applications, a web browser or other apps that allow the users 4 to take various actions, including allowing the users 4 to access applications located on other systems, or the like. In some embodiments, the user 4 utilizes the user computer systems 20 to communicate with the organization systems 10 and/or the digital resource systems 30 in order to add or edit resource pools within the resource application 37, and/or utilize a resource pool within the resource application 37 in order to enter into an interaction.

As illustrated in FIG. 1, one or more digital resource systems 30 (e.g., digital wallet systems 30 of one or more digital wallet providers) may communicate with the one or more organization systems 10, one or more user computer systems 20, and/or the one or more third party systems 40. As such, the one or more digital resource systems 30 are operatively coupled, via a network 2, to the one or more organization systems 10, the one or more user computer systems 20, the one or more third-party systems 40, and/or other systems. The one or more digital resource systems 30 generally comprise one or more communication components 32, one or more processing components 34, and one or more memory components 36. The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the one or more organization systems 10, the one or more user computer systems 20, the one or more third party systems 40, and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more digital resource systems 30 may have computer-readable instructions 38 stored in the one or more memory components 36, which in one embodiment includes the computer-readable instructions 38 of resource applications 37 (e.g., digital resource application, such as digital wallet applications, or the like) that allow for the interactions between the user 4, the third-parties, and/or organizations, as will be described herein. The one or more digital resource systems 30 may be an intelligent resource initiation and deployment system that identifies a resource pool (e.g., current or potential) for a user to utilize with a third-party (e.g., a merchant) based on the user location, the one or more entities near the user location, and/or a desired outcome based on the interests of the user and resource grants associated with utilizing various resource pools, and thereafter, notifying the user 4 on the user mobile device 20 of the resource pool before the user enters into an interaction with the third party.

Moreover, as illustrated in FIG. 1, the one or more third-party systems 40 and one or more other like systems, may be operatively coupled to the one or more organization systems 10, the one or more user computer systems 20, and/or the one or more digital resource systems 30, through the network 2. The third-party systems 40 may include the systems of product providers (e.g., merchants) with which the users 4 may enter into interactions. Moreover, the other like systems may be the systems of intermediaries that interact with the other systems described herein. It should be understood that the one or more third-party systems 40 and/or the one or more other like systems have components that are the same as or similar to the components described with respect to the one or more organization systems 10, the one or more entity computer systems 20, and/or the one or more digital resource systems 30 (e.g., one or more communication components, one or more processing components, and one or more memory devices with computer-readable instructions of one or more applications, one or more datastores, or the like). Thus, the third-party systems 40 and/or other like systems communicate with the one or more organization systems 10, the one or more user computer systems 20, the one or more resource system systems 30, and/or each other in same or similar way as previously described with respect to the one or more organization systems 10, the one or more user computer systems 20, and/or the one or digital resource systems 30.

Figure 2:
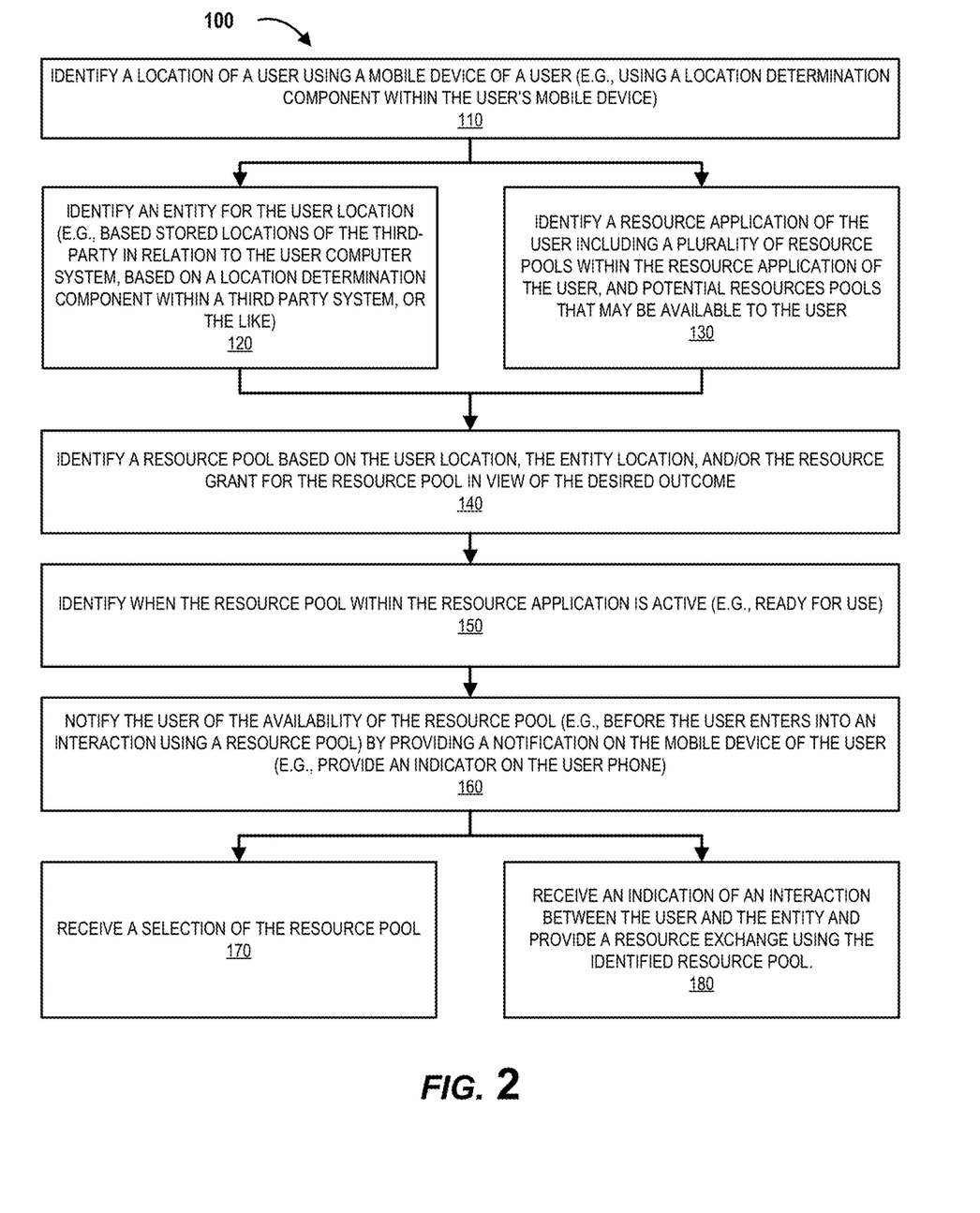
FIG. 2 illustrates an intelligent resource initiation and deployment process, in accordance with embodiments of the invention.

FIG. 2 illustrates an intelligent resource initiation and deployment process 100. Block 110 of FIG. 2 illustrates that a user location is identified by the system (e.g., organization system 10, user computer system 20, digital resource system 30, third-party system 40, or other like system). The user location may be determined based on a location determination component in the user computer system 20 (e.g., mobile device, wearable, or the like). The location determination component may comprise GPS that is used to identify the location of the user computer system 20. Another location determination component may include near-field communication (NFC), which requires the location determination component to be close (e.g., within feet or inches) of another component, such as an NFC component of the third-party (e.g., the merchant). In this way, the merchant may include multiple NFC components in the third-party location (e.g., within a store, or the like), such as at the store entrance, along a check-out line, near particular products and/or product displays within the third-party location. In this way, the NFC components may communicate with the user computer system 20 in order to determine the location of the user 4 at or within the third-party location. Other location determination components may include WiFi triangulation, geo-fencing, location beacons, z-wave technology, or other like components. The components described herein, or other components not specifically discussed, may be utilized in order to determine the location of the user 4.

Block 120 of FIG. 2 further illustrates that a third-party location may be determined in relation to the location of the user 4. The location of the third-party may be determined based on stored locations of third-parties, mapping technology, and/or a location determination component of the third-party systems or users (e.g., within user mobile devices, or the like) associated with the third-party (e.g., employees of the third party). It should be understood that one or more third-parties may be identified based on the location of a user 4. For example, the stored locations of third-parties may be compared to the location of the user 4 based on the location of the user computer system 20. Alternatively, the location of the third-party may be determined based on the location of a third-party system (e.g., if the third-party is a traveling entity, such as a pop-up merchant, the location of the third party's POS, location of a mobile device of an employee of the third party, or the like).

FIG. 2 further illustrates in block 130 that a resource application of the user and/or a plurality resource pools of the user 4 are identified. For example, the user 4 may have one or more digital wallets and/or one or more resource pools (e.g., accounts) associated with the one or more digital wallets. As such, the system may access the user's resource application on and/or through the user computer system 20 and identify the resource pools that the user 4 has active (e.g., are not expired, have a remaining balance, have been completely on-boarded, or the like), or that are not active (e.g., expired, have not been completely set up for use, or the like). Additionally, the system may also identify available resource pools which the user does not currently have, but which could be used with one or more third parties adjacent (e.g., near and/or at) the user the location. For example, the system may identify the resource pools that the user has, and thereafter, search for other resource pools that the user does not have that may provide resource grants in which the user 4 may be interested.

Figure 3:
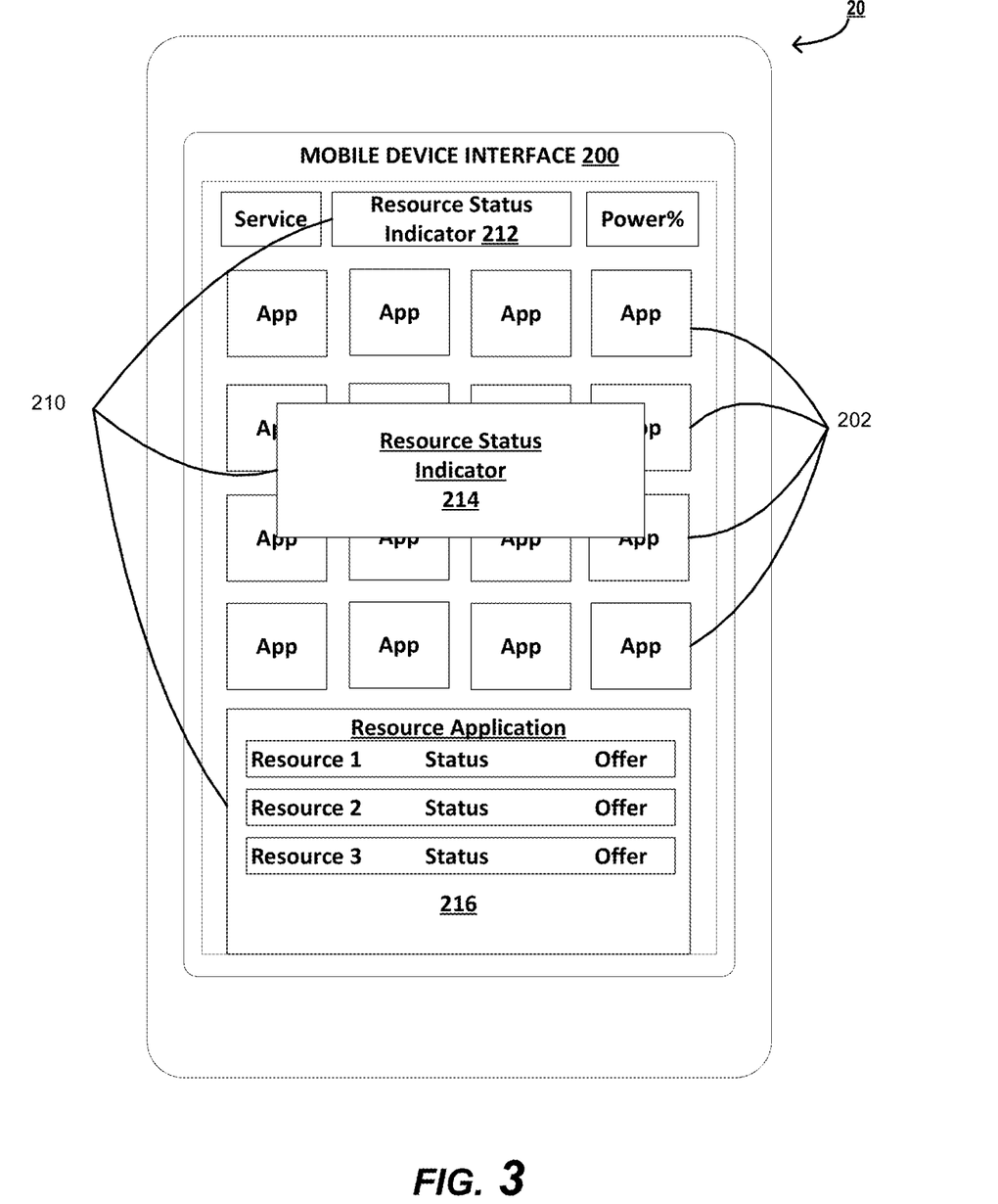
FIG. 3 illustrates mobile device interface, in accordance with embodiments of the invention.

Block 140 of FIG. 3 further illustrates that a resource pool is determined based on the user location, the entity identified for the user location (e.g., at the same location, adjacent the user location, or the like), and/or the resource grants identified for each of the resource pools (e.g., available for use or potentially available for use). It should be understood the resource pool identified may be based on what resource grants will be achieved should the user enter into an interaction (e.g., transaction) with the entity at which the user 4 is located using the resource pools (e.g., available or potentially available to the user). That is, for example, the resource pool identified may be based on the maximization of resource grants in which the user may be interested should the user 4 enter into an interaction with the entity at which the user 4 is located. It should be understood that the resource pool identified may be a resource pool that the user 4 currently has available within the user's resource application (e.g., digital wallet, or the like). Alternatively, the resource pool identified may be a resource pool that the user currently does not have within the user's resource application (e.g., digital wallet, or the like). Consequently, the identified resource pool may be based on reviewing the resource grants of available resource pools that are within the user's resource application, provided by the third-party entity at which the user is located, and/or by another entity, and determining that the available resource pool may provide the optimized resource grant for an outcome in which the user may be interested.

In some embodiments the outcome in which the user may be interested may simply be the resource pool that provides the largest resource grant (e.g., resource amount) to the user 4 based on the interaction with the third party in which the user 4 is located. Alternatively, the user 4 may pre-select a desired outcome within the resource application (e.g., within the digital wallet, or the like). The pre-selected outcome may include a request to optimize resource grants, such as resource amounts (e.g., optimize funds), optimize travel resources (e.g., travel points), optimize resource grants for a specific entity (e.g., discounts with a particular entity, or the like), or the like. In some embodiments of the invention a determination may be made that multiple resource pools may be acceptable for the interaction. For example, different resource pools with different resource grants that may be acceptable or preferred by the user 4 may be identified, and as such the multiple resources pools may be identified for use by the user 4.

It should be understood that the determination of what resource pool to suggest to the user 4, may be based on the entity name, entity products, MCC codes, or the like of the one or more entities at which the user is located (e.g., in a particular entity location or from entities near the user location). In this way, the system may determine the entity and/or products thereof at which the user is located, and then use this information identify which resource pool would result in optimizing the resource grants for interactions with the entity and/or products thereof.

FIG. 2 illustrates in block 150 that the resource pool identified may be analyzed to determine when it is active (e.g., ready for use) for a potential interaction with the entity.

It should be understood that the determination that a resource pool is active may include identifying that a resource pool identifier (e.g., account number) is still in good standing, such as is still valid, has not been reported as compromised, or the like. The determination of the active resource pool may further comprise identifying any limits that may be placed on the resource pool, such as limits stored by a primary resource pool owner related to the interactions that may be allowed with a particular resource pool, entity, product, resource amount, number of interactions, or the like. For example, the primary resource pool owner may want to limit interactions for particular resource amounts, products, and/or entities made by him/her and/or by a dependent user using a particular resource pool. In some embodiments, the determination of the resource pool being active may include whether or not the user 4 has completed setting up and/or applying for a particular resource pool. As such, in some embodiments a user may have failed to fill out required information for a resource pool for which the user 4 has submitted an application for the resource pool. In this way the determination of whether or not the user qualifies for use of the resource pool (or under what limits the user may qualify) may not be determined until the user submits additional information. As such, the system may determine if one or more of the resource pools are active, or if the user is required to take additional actions in order to activate one or more of the resource pools.

In some embodiments of the invention, the system may pre-authenticate the use of one or more of the resource pools before the user 4 even enters into an interaction with the entity. The pre-authentication may be based on limits set by the user, organization, and/or entity (e.g., merchant), which may limit the pre-approval to interactions for a particular resource amount and/or within a particular interaction time period (e.g., interactions entered into within 1 hour, or the like). In this way, the interactions may be pre-approved (e.g., within particular limits) so that the authentication processes when the interaction actually takes place is removed, which reduces the processing capacity, reduces memory requirements, and/or increases the processing speeds needed at the time of the actual interaction, as will be discussed herein.

Block 160 of FIG. 2 illustrates that a user 4 may be notified of the availability of the resource pool. For example, FIG. 3 illustrates some embodiments of the invention related to an interface for a user computer system 20 (e.g., user mobile device). However, it should be understood that any type of interface for any user computer system 20 may be utilized. FIG. 3 illustrates an interface with three different types of resource status indicators 210. The resource status indictors 210 may be displayed in the mobile device interface in order to indicate to the user 4 the resource pool user 4 may want to use with the entity at which the user is adjacent (e.g., the store in which the user 4 is located, entities located near the user 4, or the like). The resource status indicators 210 may provide an indication of the one or more recommended resource pools for entering into an interaction with the entity (e.g., for optimizing resource grants, or the like). In some embodiments, a single resource pool may be presented, while in other embodiments multiple resource pools may be provided in order to allow the user 4 to determine what resource pool to utilize based on the user's desired outcome.

The resource status indictors 210 may present not only the recommended resource pool, but other information, such as but not limited if the resource pool is active, if additional information is required to make the resource pool active, the resource grants associated with use of the resource pool with the particular entity and/or products provided by the entity adjacent the user (e.g., the store in which the user is located or stores located near the user). The resource pools may include a resource pool that the user does not currently have but may be available for the user to access. Moreover, in some embodiments, the resource status indicator may compare the suggested one or more resource pools to each other or with the resource pool that the user typically uses with the entity or typically uses in general (e.g., if the user 4 has not previously entered into an interaction with the entity). As such, the information provided by the resource status indicators 210 may allow the user 4 to enter into an interaction using a resource pool that meets the user's desired outcomes and/or provides the optimized resource grants for the user's desired outcome.

It should be understood that the resource status may be presented to the user in any way that is illustrated in FIG. 3 or other ways not specifically illustrated in FIG. 3. For example, the resource status indicator 212 may be located at the top of the interface 200 of the mobile device 20, and may include a pictorial indicator (e.g., logo, graphic, image, or the like) and/or character indicator (e.g., letters, numbers, symbols, and/or the like). The resource status may be a resource status indicator 214 that is a pop-up window, for example, similar to the pop-up indicator that may be displayed over the applications 202 displayed on the interface 200 of the mobile device 20. Alternatively, and/or additionally, the resource status indicator 216 may be within a window that slides into and/or out of the mobile device interface 200 (e.g., from the bottom of the interface, as illustrated, or the top, side, corner, or the like of the interface).

In some embodiments, the resource status indicators 210 may be presented on the interface 200 of the mobile device before the user 4 even attempts to enter into an interaction with an entity. For example, as the user 4 walks into an entity location (e.g., a store, geo-fenced area, or the like). In this way the user 4 is made aware of the available resource pools and/or the resource grants associated therewith before ever entering into an interaction with the entity at which the user is located.

Block 170 of FIG. 2 illustrates that in some embodiments of the invention, a selection of the one or more resource pools that the user 4 may want to utilize is received. For example, the user 4 may select the resource status indicator, or a resource pool provided therein, to indicate the resource pool which the user would like to use if, or when, the user enters into an interaction, to identify why the resource pool is not active, to apply for the use of the resource pool (e.g., to open a resource pool account should the user not already have access to the resource pool), and/or the like. In this way, the user 4 can quickly identify and/or apply for use of a resource pool for which the user 4 may optimize resource grants should the user 4 enter into an interaction with specific entities adjacent the user 4.

FIG. 2 further illustrates in block 180 that an indication may be received that the user and the entity enter into an interaction. The interaction may be entered by the user automatically based on the resource pool previously identified by the system for the user 4, displayed on the interface of the mobile device of the user, and/or confirmed by the user 4 (e.g., as selected by the user). In this way, the interaction may be entered by the user 4 atomically using the resource pool identified by system, or the system may require the user 4 to confirm the resource pool as the user enters into the interaction.

It should be understood that the embodiments of the invention described herein provide improved processing capacity, improved memory, and improved processing speeds. In typical interactions, resource pool decisions are made at the time of entering into the interaction. By making the determination of the resource pool to use before ever entering into the interaction with the entity, the user 4 and entity may complete the interaction much quicker using less processing capacity, less memory, and increased processing speeds (e.g., at the POS). For example, if the resource pool is identified, found to be active, and selected before the user 4 ever interacts with the entity (e.g., before interacting at the POS), then the user 4 and/or the entity do not have to make these determinations when entering into the interaction, such as at the POS. Consequently, any processing, memory, and capacity typically used in determining and selecting a resource pool when entering the interaction may be shifted to before the interaction occurs, which allows the systems to more efficiently utilize processing capacity, memory, and speeds to outside of the interaction time, which reduces the need for these requirements during the interaction time.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively monitoring the resource usage and availability. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously monitoring the real-time data feeds from the various systems, the systems may be configured to update activities associated with the systems, as described herein.

Moreover, it should be understood that the process flows described herein include transforming the data from the different systems (e.g., internally or externally) from the data format of the various systems to a data format associated with one or more displays. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for initiating and deploying resources for interactions, the system comprising:
    one or more memories having computer readable code store thereon; and
    one or more processors operatively coupled to the one or more memories, wherein the one or more processors are configured to execute the computer readable code to:
        identify a user location of a user using a user computer system of the user;
        identify an entity at which the user is located based on the user location;
        identify a plurality of resource pools;
        identify a resource pool from the plurality of resource pools based on optimization of resource grants for the plurality of resource pools based on using each of the plurality of resource pools with the entity; and
        send a resource pool notification to the user computer system of the user before the user enters into an interaction with the entity, wherein sending the resource pool notification to the user computer system of the user comprises changing an interface on a display of the user computer system to provide a resource status indicator, and wherein the resource status indicator comprises one or more resource pools, one or more resource grants for the one or more resource pools for the interaction with the entity at the user location, and an indication if the one or more resource pools are active.

2. The system of claim 1, wherein identifying the plurality of resource pools comprises
    identifying a resource application of the user and identifying one or more user resource pools within the resource application; and
    accessing one or more providers of resource pools and identifying one or more potential resource pools that the user does not currently have.

3. The system of claim 2, wherein the resource application of the user is a digital wallet and the plurality of resource pools are a plurality of resource accounts.

4. The system of claim 2, wherein identifying the resource pool from the plurality of resource pools comprises identifying an available resource pool that is currently in the resource application.

5. The system of claim 2, wherein identifying the resource pool from the plurality of resource pools comprises identifying a potential resource pool that is not in the resource application of the user.

6. The system of claim 5, wherein sending the resource pool notification to the user computer system of the user before the user enters into the interaction with the entity comprises notifying the user of the potential resource pool that is not in the resource application of the user by changing the interface on the display of the user computer system of the user.

7. The system of claim 1, wherein
    the resource status indicator indicates that the resource pool is recommended for use with the entity.

8. The system of claim 1, wherein
    the resource status indicator indicates that the resource pool within the resource application is active and ready for use with the entity.

9. The system of claim 1, wherein
    the resource status indicator indicates that the resource pool recommended requires activation by the user before use with the entity.

10. The system of claim 1, wherein the user location is based on one or more location determining components of the user computer system of the user.

11. The system of claim 10, wherein the one or more location determining components utilize near-field communication (NFC) with one or more third-party systems in order to determine the user location.

12. The system of claim 10, wherein the one or more location determining components utilize global positioning systems (GPS) in order to determine the user location.

13. The system of claim 10, wherein the one or more location determining components utilize geo-fencing in order to determine the user location.

14. The system of claim 1, wherein identifying the resource pool from the plurality of resource pools comprises identifying the resource pool that is provided by the entity at which the user is located.

15. The system of claim 1, wherein identifying the resource pool from the plurality of resource pools based on the optimization of the resource grants comprises identifying the resource pool that provides maximized resources for the interaction with the entity at the user location.

16. A computer implemented method for initiating and deploying resources for interactions, the method comprising:
    identifying, by one or more processors, a user location of a user using a user computer system of the user;
    identifying, by the one or more processors, an entity at which the user is located based on the user location;
    identifying, by the one or more processors, a plurality of resource pools;
    identifying, by the one or more processors, a resource pool from the plurality of resource pools based on optimization of resource grants for the plurality of resource pools based on using each of the plurality of resource pools with the entity; and
    sending, by the one or more processors, a resource pool notification to the user computer system of the user before the user enters into an interaction with the entity, wherein sending the resource pool notification to the user computer system of the user comprises changing an interface on a display of the user computer system to provide a resource status indicator, and wherein the resource status indicator comprises one or more resource pools, one or more resource grants for the one or more resource pools for the interaction with the entity at the user location, and an indication if the one or more resource pools are active.

17. The method of claim 16, wherein identifying the plurality of resource pools comprises:
   identifying a resource application of the user and identifying one or more user resource pools within the resource application; and
   accessing one or more providers of resource pools and identifying one or more potential resource pools that the user does not currently have.

18. The method of claim 16, wherein
   the resource status indicator indicates that the resource pool is recommended for use with the entity.

19. A computer program product for initiating and deploying resources for interactions, the computer program product comprising at least one non-transitory computer-readable medium having computer-readable program code portions embodied therein, the computer-readable program code portions comprising:
   an executable portion configured to identify a user location of a user using a user computer system of the user;
   an executable portion configured to identify an entity at which the user is located based on the user location;
   an executable portion configured to identify a plurality of resource pools;
   an executable portion configured to identify a resource pool from the plurality of resource pools based on optimization of resource grants for the plurality of resource pools based on using each of the plurality of resource pools with the entity; and
   an executable portion configured to send a resource pool notification to the user computer system of the user before the user enters into an interaction with the entity, wherein sending the resource pool notification to the user computer system of the user comprises changing an interface on a display of the user computer system to provide a resource status indicator, and
   wherein the resource status indicator comprises one or more resource pools, one or more resource grants for the one or more resource pools for the interaction with the entity at the user location, and an indication if the one or more resource pools are active.

20. The computer program product of claim 19, wherein the computer-readable program code portions further comprise:
   an executable portion configured to identify a resource application of the user and identify one or more user resource pools within the resource application; and
   an executable portion configured to access one or more providers of resource pools and identify one or more potential resource pools that the user does not currently have.

\* \* \* \* \*